US012254087B2

(12) United States Patent
Wang et al.

(10) Patent No.: US 12,254,087 B2
(45) Date of Patent: Mar. 18, 2025

(54) TRANSLATION LOOKASIDE BUFFER (TLB) POISONING ATTACKS ON SECURE ENCRYPTED VIRTUALIZATION

(71) Applicant: Baidu USA, LLC, Sunnyvale, CA (US)

(72) Inventors: Huibo Wang, Milpitas, CA (US); Kang Li, Santa Clara, CA (US); Mengyuan Li, Columbus, OH (US); Yinqian Zhang, Sunnyvale, CA (US); Yueqiang Cheng, San Jose, CA (US)

(73) Assignee: Baidu USA LLC

( * ) Notice: Subject to any disclaimer, the term of this patent is extended or adjusted under 35 U.S.C. 154(b) by 457 days.

(21) Appl. No.: 17/746,585

(22) Filed: May 17, 2022

(65) Prior Publication Data

US 2023/0098117 A1 Mar. 30, 2023

Related U.S. Application Data

(60) Provisional application No. 63/248,418, filed on Sep. 24, 2021.

(51) Int. Cl.
*G06F 21/52* (2013.01)
*G06F 9/455* (2018.01)
(Continued)

(52) U.S. Cl.
CPC ........ *G06F 21/566* (2013.01); *G06F 9/45558* (2013.01); *G06F 12/1483* (2013.01);
(Continued)

(58) Field of Classification Search
CPC ........................ G06F 21/52; G06F 2009/45587
See application file for complete search history.

(56) References Cited

U.S. PATENT DOCUMENTS 8,209,510 B1   6/2012  Tuli
11,010,495 B1 *  5/2021  McArdle ................. G06F 8/52
(Continued)

FOREIGN PATENT DOCUMENTS

CN         111400081 A        7/2020

OTHER PUBLICATIONS

Mi et al. "(Mostly) Exitless VM Protection from Untrusted Hypervisor through Disaggregated Nested Virtualization" SEC'20: Proceedings of the 29th USENIX Conference on Security Symposium Article No. 96, pp. 1695-1712 Aug. 12, 2020 (Year: 2020).*
(Continued)

*Primary Examiner* — David J Pearson
(74) *Attorney, Agent, or Firm* — Oppedahl Patent Law Firm LLC

(57) ABSTRACT

TLB poisoning attacks take advantage of security issues of translation lookaside buffer (TLB) management on SEV processors in Secure Encrypted Virtualization (SEV) virtual machines (VMs). In various embodiments, a hypervisor may poison TLB entries between two processes of a SEV VM to compromise the integrity and confidentiality of the SEV VM. Variants of TLB poisoning attacks and end-to-end attacks are shown to be successful on both Advanced Micro Devices (AMD) SEV and SEV-Encrypted State (SEV-ES). Countermeasures for thwarting TLB poisoning attacks include hardware-enforced TLB flush processes and re-exec schemes that, among other things, prevent attackers from manipulating TLB entries and causing a privileged victim process to execute malicious code in an attempt to bypass a password authentication.

8 Claims, 10 Drawing Sheets

(51) Int. Cl.
| | |
|---|---|
| G06F 12/14 | (2006.01) |
| G06F 21/54 | (2013.01) |
| G06F 21/55 | (2013.01) |
| G06F 21/56 | (2013.01) |
| G06F 21/57 | (2013.01) |
| G06F 21/60 | (2013.01) |
| G06F 21/75 | (2013.01) |

(52) U.S. Cl.
CPC .............. *G06F 21/52* (2013.01); *G06F 21/54* (2013.01); *G06F 21/554* (2013.01); *G06F 21/556* (2013.01); *G06F 21/577* (2013.01); *G06F 21/602* (2013.01); *G06F 21/75* (2013.01); *G06F 2009/45583* (2013.01); *G06F 2009/45587* (2013.01); *G06F 2212/1052* (2013.01); *G06F 2221/034* (2013.01)

(56) References Cited

U.S. PATENT DOCUMENTS

| | | | |
|---|---|---|---|
| 2001/0011304 | A1 | 8/2001 | Coley |
| 2002/0046230 | A1 | 4/2002 | Davis |
| 2008/0244155 | A1 | 10/2008 | Lee |
| 2013/0047168 | A1 | 2/2013 | Shah |
| 2019/0228155 | A1* | 7/2019 | Basak ................... G06F 12/126 |
| 2019/0361815 | A1 | 11/2019 | Tsirkin |
| 2022/0114135 | A1 | 4/2022 | Rahman |
| 2022/0264503 | A1 | 8/2022 | Starsinic |

OTHER PUBLICATIONS

Radev et al. "Exploiting Interfaces of Secure Encrypted Virtual Machines" arXiv:2010.07094 Oct. 14, 2020 (Year: 2020).*

Morbitzer et al. "SEVerity: Code Injection Attacks against Encrypted Virtual Machines" arXiv:2105.13824 May 28, 2021 (Year: 2021).*

Non-Final Office Action received in the related matter U.S. Appl. No. 17/746,559, mailed May 30, 2024, (27pgs).

AMD, "AMD virtualization (amd-v)," [online], [Retrieved Feb. 21, 2024]. Retrieved from Internet <URL:https://www.amd.com/en/technologies/>virtualization-solutions, 2021. (13pgs).

Costan et al.,"Intel SGX explained," IACR Cryptol. ePrint Arch., vol. 2016, No. 86, pp. 1-118, 2016.(118 pgs).

Microsoft, "Azure and AMD announce landmark in confidential computing evolution," [online], [Retrieved Feb. 21, 2024]. Retrieved from Internet <URL:https://azure.microsoft.com/en-us/blog/azure-and-amd-enable-lift-and-shift-confidential-computing/>2021. (4pgs).

Google, "Introducing Google Cloud Confidential Computing with Confidential VMs," [online], [Retrieved Feb. 21, 2024]. Retrieved from Internet <URL:https://cloud.google.com/blog/products/identity-security/introducing-google-cloud-confidential-computing-with-confidential-vms> 2020. (12pgs), 2020.

Hetzelt et al., "Security Analysis of Encrypted Virtual Machines," arXiv preprint arXiv:1612.01119, 2017. (14pgs).

Werner et al.,"The SEVerESt of Them All: Inference Attacks Against Secure Virtual Enclaves," in ACM Asia Conference on Computer and Communications Security, 2019. (13 pgs).

D. Kaplan, "Protecting VM register state with SEV-ES," White paper, 2017. (8pgs).

Buhren et al.,"Fault Attacks on Encrypted General Purpose Compute Platforms," arXiv preprint arXiv:1612.03744, 2016. (18pgs).

Maurice et al.,"Hello from the other side: SSH over robust cache covert channels in the cloud," in NDSS, vol. 17, 2017. (15pgs).

Lipp et al.,"Take a way: Exploring the security implications of AMD's cache way predictors," in 15th ACM Asia Conference on Computer & Communications Security (ACM ASIACCS 2020), 2020.(13pgs), 2020.

Lee et al.,"From zygote to morula: Fortifying weakened aslr on android," in 2014 IEEE Symposium on Security & Privacy, IEEE, 2014. (16 pgs).

M. Johnston, "Dropbear SSH," [online], [Retrieved Feb. 22, 2024]. Retrieved from Internet <URL:https://github.com/mkj/dropbear> 2021.(1p).

H. Shacham, "The geometry of innocent flesh on the bone: Return-into-libc without function calls (on the x86)," In: 14th ACM Conference on Computer and Communications Security (ACM), 2007. (30pgs), 2007.

NVD, [online], [Retrieved Feb. 20, 2024]. Retrieved from Internet <URL:https://nvd.nist.gov/vuln/detail/CVE-2021-26340> (23pgs), 2021.

AMD, [online], [Retrieved Feb. 22, 2024]. Retrieved from Internet <URL:https://www.amd.com/en/corporate/product-security/bulletin/amd-sb-1023> (10pgs).

Li et al.,"Cipherleaks: Breaking Constant-time Cryptography on AMD SEV via the Ciphertext Side Channel," in 30th USENIX Security Symposium, 2021. (17pgs).

Du et al.,"Secure encrypted virtualization is unsecure," arXiv preprint arXiv:1712.05090, 2017. (10pgs).

Morbitzer et al.,"SEVered: Subverting AMD's virtual machine encryption," arXiv preprint arXiv:1805.09604, 2018. (6pgs).

Morbitzer et al.,"Extracting Secrets from Encrypted Virtual Machines," arXiv preprint arXiv:1901.01759, 2019. (10pgs).

Li et al.,"Exploiting Unprotected I/O Operations in AMD's Secure Encrypted Virtualization," in 28th USENIX Security Symposium, 2019. (17pgs).

Wilke et al.,"SEVurity: No security without integrity: Breaking integrity-free memory encryption with minimal assumptions," arXiv preprint arXiv:2004.11071, 2020. (14pgs).

AMD, "AMD SEV-SNP: Strengthening VM Isolation with Integrity Protection and More," White paper, 2020.(20pgs).

Li et al.,"CrossLine: Breaking "Security-by-Crash" based Memory Isolation in AMD SEV," arXiv preprint arXiv:2008.00146, 2020. (14pgs).

Kaplan et al.,"AMD memory encryption," White paper, 2021. (12pgs).

AMD, "AMD64 architecture programmer's manual vol. 2: System programming," AMD64 Technology, 2019. (833pgs).

Hund et al.,"Practical Timing Side Channel Attacks Against Kernel Space ASLR," in 2013 IEEE Symposium on Security & Privacy, IEEE, 2013. (15pgs).

Jang et al.,"Breaking kernel address space layout randomization with intel TSX," in Proc. of the 2016 ACM SIGSAC Conference on Computer & Communications Security, 2016.(13pgs).

Barresi et al.,"CAIN: silently breaking ASLR in the cloud," in 9th USENIX Workshop on Offensive Technologies (WOOT 15), 2015. (9pgs).

Koschel et al.,"TagBleed: Breaking KASLR on the Isolated Kernel Address Space using Tagged TLBs," in 2020 IEEE European Symposium on Security & Privacy (EuroS&P), IEEE, 2020. (13pgs), 2020.

Gras et al.,"ASLR on the Line: Practical Cache Attacks on the MMU," in NDSS, vol. 17, 2017. (15pgs).

Weston et al.,"Windows 10 mitigation improvements," Black Hat USA, 2016. (41 pgs).

AMD, "AMD-V nested paging," [online], [Retrieved Feb. 22, 2024]. Retrieved from Internet <URL:http://developer.amd.com/wordpress/media/2012/10/NPT-WP-1%201-final-TM.pdf> 2008. (13P.

"AMDSEV/SEV-ES branch," [online], [Retrieved Feb. 22, 2024]. Retrieved from Internet <URL:https://github.com/AMDESE/AMDSEV/tree/sev-es> 2020. (1p).

Maurice et al.,"C5: Cross-Cores Cache Covert Channel," in International Conference on Detection of Intrusions and Malware, and Vulnerability Assessment, Springer, 2015.[Abstract] (12 pgs), 2015.

* cited by examiner

800

```
IN RESPONSE TO AN EVENT IN A SECURE ENCRYPTED
VIRTUALIZATION-ENABLED VICTIM VIRTUAL MACHINE
(VM), USING HARDWARE TO ENFORCE A TRANSLATION
LOOKASIDE BUFFER (TLB) FLUSH FOR THE VICTIM VM'S
ADDRESS SPACE IDENTIFIER TO PREVENT A VICTIM         ⎯ 805
PROCESS FROM ACCESSING ONE OR MORE POISONED
TLB ENTRIES THAT ARE MANIPULATED BY AN ATTACKER
PROCESS TO BYPASS A PASSWORD AUTHENTICATION
TO PREVENT THE VICTIM PROCESS FROM USING
POISONED TLB ENTRIES TO EXECUTE MALICIOUS CODE
```

FIG. 8

TRANSLATION LOOKASIDE BUFFER (TLB) POISONING ATTACKS ON SECURE ENCRYPTED VIRTUALIZATION

COPYRIGHT NOTICE

A portion of the disclosure in this patent document contains material that is subject to copyright protection. The copyright owner has no objection to the facsimile reproduction by anyone of the patent document, as it appears in the Patent and Trademark Office patent file or records, but otherwise reserves all copyright rights whatsoever.

CROSS-REFERENCE TO RELATED APPLICATION(S)

This patent application is related to and claims priority benefit under 35 USC § 119(e) to co-pending and commonly-owned U.S. Pat. App. No. 63/248,418, filed on Sep. 24, 2021, entitled "Translation Lookaside Buffer (TLB) Poisoning Attacks On Secure Encrypted Virtualization," and listing Huibo Wang, Kang Li, Mengyuan Li, Yinqian Zhang, and Yueqiang Cheng as inventors, which patent document is incorporated by reference herein in its entirety and for all purposes.

BACKGROUND

A. Technical Field

The present disclosure relates generally to computer security. More particularly, the present disclosure relates to attacks on SEV processors by an untrusted hypervisor and appropriate countermeasures.

B. Background

Computers have become almost completely ubiquitous. From smart phones, tablet computers, smart appliances, laptop computers, cloud computing, embedded devices, Internet of Things (IoT) devices, and other devices, computing devices are extensively used and have extensive access to critical information. As their use and prevalence increases, they create increasing concerns regarding computer security.

Advanced Micro Devices' (AMD's) SEV Secure Encrypted Virtualization (SEV) is an emerging technology of AMD server processors that provides transparent memory encryption and key management for virtual machines (VMs). SEV supports full VM encryption and, thus, makes porting applications straightforward. By not trusting the underlying hypervisor, SEV forms a foundation for confidential computing. Despite its attempt to provide security, SEV has known vulnerabilities that may be exploited by malicious individuals or entities.

Accordingly, what is needed are the discovery of and effective countermeasures against such vulnerabilities to enhance security-related computer technologies, such as confidential cloud computing.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 8 is a hardware-enforced TLB flush process for mitigating hypervisor— controlled TLB poisoning attacks, according to embodiments of the present disclosure

DETAILED DESCRIPTION OF EMBODIMENTS

Figure 1:
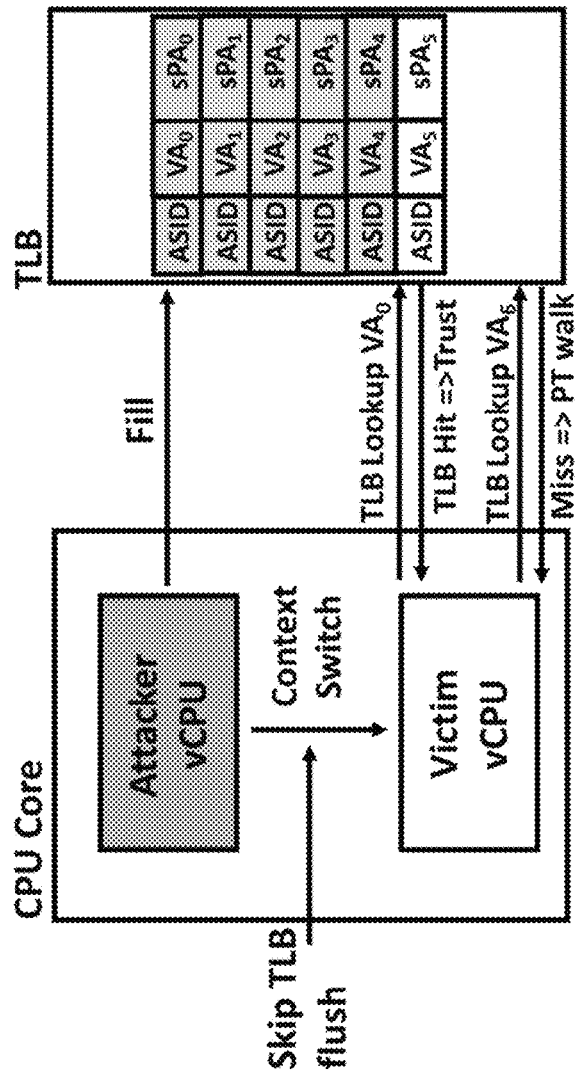
FIG. 1 depicts TLB misuse across virtual Central Processing Units (vCPUs), according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled,"

"interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms, and any lists of items that follow are example items and not meant to be limited to the listed items. A "layer" may comprise one or more operations. The use of memory, database, information base, data store, tables, hardware, cache, and the like may be used herein to refer to system component or components into which information may be entered or otherwise recorded. A set may contain any number of elements, including the empty set.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It is noted that although embodiments described herein may be within the context of software-based side channel attacks, aspects of the present disclosure are not so limited. Accordingly, aspects of the present disclosure may be applied or adapted for use in hardware-based attacks, including side channel attacks, and other contexts.

In this document, the term "page walk" and "page table walk" are used interchangeably. Similarly, the terms "system physical address" and "host physical address;" "host" and "system;" "idle loop" and" "empty loop;" "world switch," "context switch," and "internal switch;" "host OS" and "system OS;" and "victim VM" and" "guest VM" may be used interchangeably. The term "guest" refers to any operating system that is virtualized, and the term "hypervisor" refers to any platform layer the decouples an operating system from its underlying hardware. A "nested page table" refers to a page table that comprises a translation from a guest physical address to a system physical address or host physical address.

A. General Introduction

AMD's Secure Encrypted Virtualization (SEV) is a security feature of AMD Virtualization (AMD-V) that prevents privileged cloud providers from manipulating or inspecting data and applications of cloud tenants. SEV supports full VM encryption through a hardware memory encryption engine and a secure co-processor (e.g., AMD-SP) that transparently manages hardware encryption keys. Compared to Intel's Software Guard Extension (SGX), SEV is more advantageous in its ease of adoption, without the need of altering software to be protected. So far, SEV has been adopted in Azure Cloud and Google Cloud as a backend of confidential cloud computing services.

Nonetheless, numerous works have shown that SEV is vulnerable in several aspects: First, the VMCB used to store register values and control information is not encrypted during context switch, allowing a malicious hypervisor to manipulate or inspect register values of guest VMs, which may lead to a breach of confidentiality or integrity of guest VMs. To counter these threats, AMD released a second generation of SEV, SEV Encrypted State (SEV-ES) in which register states in VMCB are encrypted and saved in the VM Save Area (VMSA) during a world switch. Necessary register values are passed through a Guest-Hypervisor Communication Block (GHCB), which is not encrypted.

Second, neither SEV nor SEV-ES protect the integrity of encrypted memory and nested page tables (NPT). Therefore, a malicious hypervisor may replay encrypted memory blocks or change the mapping of guest memory pages in NPTs to breach the security of SEV and SEV processors. To mitigate these attacks, AMD released a third generation of SEV, SEV Secure Nested Paging (SEV-SNP), which uses a Reverse Map Table (RMP) and a page validation mechanism to prevent malicious modification of NPTs by tracking memory ownership. According to AMD, SEV-SNP provides strong integrity protection for guest VMs to mitigate such attacks.

Third, SEV, including SEV-ES and SEV-SNP, allows an untrusted hypervisor to manage the address space identifier (ASID), which is used to control the VM's accesses to the encrypted memory. AMD adopted a "security-by-crash" design, which assumes that mismatch in ASIDs could lead to VM crashes and, hence, guarantees the security of the guest VMs. However, ASIDs have been exploited in Crossline attacks, which leverage the short time window before a VM crashes to leak secret data through page faults or to execute instructions that form decryption and encryption oracles.

Outlined herein are embodiments of a new category of security attacks against SEV, namely TLB poisoning attacks that enable an adversary who controls the hypervisor to manipulate TLB entries that are shared between two processes of the same SEV VM. One root cause of TLB poisoning attacks is that, by design, the hypervisor is in control of the TLB flushes in SEV. Specifically, because TLB is tagged with ASIDs to distinguish TLB entries used by different entities, unnecessary TLB flushes may be avoided during the world switches (VMEXIT and VMRUN between the guest VM and the hypervisor) or context switches (context switches between the process hosting the guest VM's current vCPU and other processes). As it is difficult for the CPU hardware to determine whether to flush the entire TLB or only TLB entries with certain ASIDs, the TLB flush is solely controlled by the hypervisor. The hypervisor may inform the CPU hardware to fully (or partially) flush the TLB, by setting the TLB control field in the VMCB, to take effect after VMRUN. As a result, an adversary may intentionally skip TLB flushes to cause a victim process of the victim SEV VM to use TLB entries injected by another process of the same VM.

Two exemplary scenarios of TLB poisoning attacks are considered: (1) using an unprivileged attacker process running in the targeted SEV VM, an adversary may poison TLB entries used by a privileged process and alter its execution; and (2) without the help of a process that is directly controlled by the adversary, the adversary may still exploit the misuse of TLB entries on a network-facing process (also not under the adversary's control) that share the same (or similar) virtual address space with a targeted process and bypass authentication checks. To demonstrate the feasibility of these two attack scenarios, two end-to-end attacks against two SSH servers were performed on an AMD EPYC™ Zen processor supporting SEV-ES.

Embodiments presented herein comprise the following contributions to the security of AMD SEV processors and confidential computing technology in general:

First, they demystify AMD SEV's TLB management mechanisms and identify a severe design flaw of TLB isolation that leads to misuse of TLBs under the assumption of a malicious or compromised hypervisor or other untrusted privileged software.

Second, they present a novel category of attacks against SEV, namely TLB poisoning attacks, which manipulate the TLB entries shared by two processes within the same SEV VM and breach the integrity and confidentiality of one of the processes.

Third, they demonstrate two end-to-end TLB poisoning attacks against SEV-ES-protected VMs. One attack shows the feasibility of manipulating TLB entries to change code execution of the victim process. Another attack provides an example of stealing secret data from the victim process by a process, which is not controlled by the adversary, by using shared TLB entries.

B. General Background Information

Some background information about SEV's memory and TLB isolation is presented next.

Secure Encrypted Virtualization (SEV): AMD's memory encryption feature for AMD-V, SEV aims to produce a confidential VM environment in the public cloud and protect VMs from the privileged but untrustworthy cloud hosts (e.g., a hypervisor). SEV is built on an on-chip encryption system comprising an ARM Cortex-A5 co-processor and AES encryption engines. The co-processor, also known as AMD-SP, stores and maintains a set of VM encryption keys ($K_{vek}$) which is uniquely assigned to each SEV-enabled VM. The $K_{vek}$ in the co-processor cannot be accessed by either the privileged hypervisor or the guest VM itself. The AES encryption engine automatically encrypts all data in the memory, and decrypts them in the CPU by using the correct $K_{vek}$.

Nested Page Tables. AMD adopts two-level of page tables to help the hypervisor manage the SEV VM's memory mapping. The upper-level page table, called the guest page table (gPT), is part of the guest VM's encrypted memory. It is maintained by the guest VM and is usually a 4-level page table that translates the guest virtual address (gVA) to the guest physical address (gPA). Moreover, a Guest Page Fault (gPF) caused by the gPT walk is trapped and handled by the guest VM. The lower-level page table, called NPT or host page table (hPT), translates gPA to system physical address (sPA) and is maintained by the hypervisor. The NPT structure gives the SEV VM the ability to configure the memory pages' encryption states. By changing the C-bit (Bit 47 in the page table entry) to 1 or 0, the states of the guest VM's memory page can either be private (encrypted with his $K_{vek}$) or shared (encrypted with the hypervisor's $K_{vek}$) The gPT and all instruction pages are forced to be private states no matter the value of C-bit.

Moreover, Nested Page Faults (NPFs) may be triggered by the hardware during the NPT walk. According to the NPF event, the hypervisor can grab useful information that could reflect the behavior of a program and, therefore, leak sensitive information, including the gPA of the NPT and the NPF error code. This forms a well-known controlled-channel attack, which compromises SEV's confidentiality and integrity.

Address Space Layout Randomization (ASLR). ASLR is a widely used spectrum protection technique that randomizes virtual memory areas (VMAs) of a process to defend against memory corruption attacks. This defense mechanism prevents attackers from directly learning a pointer's virtual address and forces them to rely on software vulnerabilities or side-channel attacks to locate the randomized virtual address. Different operating systems have different ASLR implementations. For example, a 64-bit Linux system usually exhibits 28-bits of ASLR entropy for executables, while Windows 10 exhibits only 17-19 bits of ASLR entropy for executables.

Translation Lookaside Buffer and Address Space Identifier (ASID). TLB is a caching hardware inside the chip's memory-management unit (MMU). After a successful page table walk, the mapping from the virtual address to the system address is cached in TLB. For a nested page table on SEV, the mapping of the gVA and the sPA is cached in the TLB. During a page table walk, given a guest CR3 (gCR3) and a host CR3 (hCR3), the hardware automatically translates a gVA to an sPA using the two-level page tables despite the gPT and the NPT being encrypted by different $K_{vek}$s. AMD-SP uses ASID to uniquely identify the SEV-enabled VM and its $K_{vek}$. ASID is also part of the tag for both cache lines and TLB entries.

C. Understanding and Demystifying SEV's TLB Isolation Mechanisms

In this section, an understanding of TLB isolation mechanisms used in AMD-V for both non-SEV VMs and SEV-enabled VMs is briefly set forth.

1. TLB Management for Non-SEV VM Embodiments

To avoid frequent TLB flushes during VM world switches, AMD introduced ASIDs in TLB entries. ASID 0 is reserved for the hypervisor, and the remainder of ASIDs are used by the VM. The range of the ASID pool can be determined by CPUID 0x8000000a[EBX]. TLB is tagged with the ASIDs of each VM and the hypervisor, which avoids flushing the entire TLB at the world switch and also prevents misuse of the TLB entries belonging to other entities.

The TLB management algorithm for non-SEV VMs has been explored by examine the source code of AMD SVM. Specifically, the hypervisor is responsible for maintaining the uniqueness and the freshness of the ASID in each logical core of the machine. For each logical core, the hypervisor stores the most recently used ASID in the svm_cpu_data data structure. Before each VMRUN of a vCPU of a non-SEV VM, the hypervisor checks whether the CPU affinity of the vCPU has changed by comparing the ASID stored in its VMCB with the most recently used ASID of this logical core. If a mismatch is observed, which means either the vCPU was not running on this logical core before the current VM Exit (VMEXIT) or more than one vCPU sharing the same logical core concurrently, the hypervisor assigns an incremental and unused ASID to this vCPU. In either of these cases, incrementing the ASID ensures the residual TLB entries cannot be reused. Otherwise, no TLB flushing may be needed and the vCPU can keep its ASID and reuse its TLB entries after VMRUN.

The hypervisor is in charge of enforcing TLB flushes under certain conditions. For example, when the recently used ASID exceeds the max ASID range on the logical core, a complete TLB flush for all ASIDs may be required. To flush TLBs, the hypervisor sets the TLB_CONTROL bits in TLB_CONTROL field (058h) of the VMCB during VMEX-ITs. With different values of bits 39:32 of TLB_CONTROL, the hardware may perform different operations on the TLB:

TLB_CONTROL_DO_NOTHING (00 h). The hardware does nothing.

TLB_CONTROL_FLUSH_ALL_ASID (01 h). The hardware flushes the entire TLB.

TLB_CONTROL_FLUSH_ASID (03 h). The hardware flushes all TLB entries whose ASID is equal to the ASID in the VMCB.

TLB_CONTROL_FLUSH_ASID_LOCAL (07 h). The hardware flushes this guest VM's non-global TLB entries.

Other values. All other values are reserved. As a result, these values may cause problems when resuming a guest VM process.

After each VMRUN, hardware checks these bits and performs the corresponding actions. The hypervisor is in charge of informing the hardware to flush TLBs and maintaining TLB isolation. Hardware may also automatically perform a partial TLB flush without triggering a special VMEXIT, e.g., when observing context switches or MOV-to-CR3 instructions. In such cases, only the TLB entries tagged with the current ASID (either in the guest ASID or the hypervisor ASID) are flushed.

2. Demystifying SEV's TLB Management Embodiments

The TLB management for SEV VMs and non-SEV VMs is slightly different. The ASIDs of SEV VMs remain the same during their lifetime. Therefore, instead of dynamically assigning an ASID to a vCPU, all vCPUs of the same SEV VM have the same ASID. At runtime, TLB flush is still controlled by the hypervisor. Especially, KVM records the last resident CPU core of each vCPU. For each CPU logical core, KVM also records the VMCB of the last running vCPU (sev_vmcbs [asid]) for each ASID. Before the hypervisor resumes a vCPU via VMRUN, it sets the TLB control field in the VMCB to the value of TLB_CONTROL_FLUSH_ ASID when (1) this vCPU was not run on this core before, or (2) the last VMCB running on this core with the same ASID is not the current VMCB. This enforces the isolation between two vCPUs of the same SEV VM. The code is listed in Listing 1. However, if the hypervisor chooses not to set the TLB control field, no TLB entries will be flushed.

Listing 1: Code snippet of pre_sev_run( ) embodiment

```
1    struct svm_cpu_data *sd = per_cpu (svm_data, cpu);
2    int asid = sev_get_asid(svm -> vcpu.kvm );
3    pre_sev_es_run(svm);
4    svm ->vmcb -> control.asid = asid;
5    // No CPU affinity change and No VMCB change
6    if     (sd ->sev_vmcbs[asid] == svm->vmcb &&
7            svm ->vcpu.arch.last_vmentry_cpu == cpu)
8        return;
9    // Otherwise , flush the TLB tagged with the ASID
10   sd -> sev_vmcbs[asid] = svm -> vmcb ;
```

Listing 1: Code snippet of pre_sev_run( ) embodiment

```
11   svm ->vmcb ->control.tlb_ctl =
         TLB_CONTROL_FLUSH_ASID;
12   vmcb_mark_dirty(svm ->vmcb, VMCB_ASID);
13   }
```

Experiments to demystify TLB tags. According to the AMD manual, an ASID is part of a TLB tag. But it is unclear what the remaining parts of the tag are. Experiments were conducted to explore the structure of TLB tags. Specifically, it was examined whether vCPUs' TLB entries on co-resident logical cores influence each other, and whether TLB entries from different VM modes (non-SEV, SEV, or SEV-ES) influence each other. Experimental settings were similar. To explore TLB isolation between co-resident logical cores, the ASID of two vCPUs were manually set to two co-resident logical cores of the same physical core. To explore TLB isolation between VMs with different VM modes (e.g., SEV and non-SEV), a non-SEV VM and a SEV/SEV-ES VM were configured on the same logical core, and the non-SEV VM's ASID was set to be identical to the SEV/SEV-ES VM's ASID. In both cases, the TLB flush was skipped to check whether TLB poisoning could be observed (using steps in Section D.2.1). In neither of the two cases was TLB poisoning observed. Therefore, one may conclude:

ASID is a part of the TLB tag, which provides TLB isolation for TLB entries with different ASIDs.

Logical Core ID is a part of the TLB tag, which provides TLB isolation for TLB entries on the same physical core but different logical cores.

VM mode is a part of the TLB tag. Even if a non-SEV VM has the same ASID as a SEV or SEV-ES VM, the TLB tag field contains information about the VM's mode, which isolates TLB entries from VMs in different modes.

Besides these components, it may further be assumed that the C-bit in the guest page table (gC-bit) and the C-bit in the nested page table (nC-bit) are also part of the TLB tag. The reason is that when address translation bypasses the page table walk, the values of the gC-bit and nC-bit are still required for the processor to determine which ASID to present to AMD-SP if memory encryption is needed. However, there is no direct evidence to ascertain the exact C-bit tag format in TLB entries. There may be no way to empirically affirm whether, for instance, only one C-bit or both C-bits are in the TLB tag.

3. TLB Flush Rules for SEV VMs Embodiments

The TLB flush rules for SEV/SEV-ES VMs in both hardware-enforced TLB flush and the hypervisor-coordinated TLB flush are summarized in Table 1. The hardware-enforced TLB flush rules cannot be skipped, while the hypervisor-coordinated TLB flush may be skipped by a malicious hypervisor, which is the root cause of the TLB poisoning attack.

TABLE 1

TLB flush rules.

| World | Events | TLB Tag | Forced |
|---|---|---|---|
| Host/Guest | MOV-to-CR3, Context-switch | O/N | ✓ |
| Host/Guest | Update Cr0.PG | O/N | ✓ |
| Host/Guest | Update: CR4 (PGE, PAEm and PSE) | O/N | ✓ |

TABLE 1-continued

TLB flush rules.

| World | Events | TLB Tag | Forced |
|---|---|---|---|
| Host | Address translation Registers | All | ✓ |
| Host | Activate an ASID for SEV VM | N | ✓ |
| Host | Deactivate an ASID for SEV VM | N | ✗ |
| Host | ASID exceeds ASID pool range | All | ✗ |
| Host | Two vCPUs switch | 0 + N* | ✓ + ✗ * |
| Host | Change vCPU's CPU affinity | N | ✗ |

The World column indicates whether the event happens in host world or the guest world;
TLB Tag represents the TLB entry's ASID to be flushed—the host's ASID is 0 and the SEV VM's ASID is N;
Forced indicates whether the TLB flush is forced by the hardware or controllable by the hypervisor.
*highlights a special case, in which when the world switch happens between two vCPUs, the TLB tagged with 0 is forced to be flushed while the TLB tagged with N is flushed under the control of the hypervisor.

Hardware-enforced TLB flushes. All TLB entries are flushed when there is System Management Interrupt (SMI), Returning from System Management (RSM), Memory-Type Range Register (MTRR), and I/O Range Registers (IORR) modifications or MSRs access related to address translation, irrespective of ASID. At the same time, hardware will automatically flush TLB tags with the current ASID when observing activities like MOV-to-CR3, context switches, updates of CR0.PG, CR4. PGE, CR4. PAEm, and CR4. PSE. Hardware will also force a TLB flush when the hypervisor wants to activate an ASID for a SEV VM.

Hypervisor-coordinated TLB flushes. There are mainly two cases of hypervisor-coordinated flushes in TLB management: (1) when different VMCBs with the same ASID (different vCPUs of the same SEV VM) are to run on the same logical core; and (2) when the VMCB to be run was executed on a different logical core prior to the current VMRUN.

D. Attack Primitives Embodiments

In this section, the threat models considered in this patent document are discussed, and three attack primitives are introduced: TLB misuse across vCPUs (Section D.2), TLB misuse within the same vCPU (Section D.3), and a covert data transmission channel between the hypervisor and a process in the victim VM that is under the adversary's control (Section D.4).

1. Threat Model Embodiments

It is assumed that a platform is hosted by a hypervisor that is controlled by an adversary, the victim VM is an SEV-ES-enabled VM and, thus, protected by all SEV-ES features. It is further assumed that ASLR is enabled in the victim VM. An unprivileged attacker process controlled by the adversary that is running in the victim VM does not have access to the kernel or learn sensitive information from prods. The attacker process needs no capabilities to perform network communication. It is noted that the assumption of having an attacker process running in the victim VM can be weakened (see, Section F). The victim process may be any process in the victim VM other than the attacker processes. It is also assumed that the adversary can learn the virtual address range of the victim VM via any other attack, e.g., a Cross-Line attack.

2. TLB Misuse Across vCPUs Embodiments

When the victim VM has more than one vCPU, the attacker process and the victim process can run on different vCPUs. The vCPU running the attacker process is herein referred to as the attacker vCPU, and the vCPU running the victim process is referred to as the victim vCPU. In one or more embodiments, an adversary may misuse TLB entries by skipping the TLB flush during the context switch of these two vCPUs. Two examples illustrate how this may be exploited to breach the integrity and confidentiality of a victim process:

a) TLB Poisoning Embodiments

As illustrated in FIG. 1, an attacker process may poison TLB entries to alter the execution of the victim process, e.g., by using the following steps:

Step-I: In one or more embodiments, the victim process is suspended before executing an instruction at address $VA_0$. This may be achieved, e.g., by manipulating page table entries (PTEs) to trigger NPFs. It is noted that the content of this instruction is not relevant to this attack.

Step-II: The hypervisor schedules the attacker vCPU to the same logical core as the victim vCPU, and the TLB control field is set to TLB_CONTROL_FLUSH_ASID (03 h) to flush the TLB entries with the SEV VM's ASID.

Step-III: The hypervisor then instructs the attacker process to run an instruction sequence "mov $0x2021, % rax; CPUID" also at address $VA_0$. The CPUID instruction will trigger a VMEXIT. During the VMEXIT, the attacker vCPU is paused, and the victim vCPU is scheduled to run without flushing the TLB entries.

Step-IV: When the victim process executes the instruction at $VA_0$, a VMEXIT due to CPUID can be observed with the % rax value set to 0x2021 in the GHCB. This means the victim process has been successfully tricked to execute the same instruction as the attacker process at VA0, because it reuses the TLB entry poisoned by the attacker process.

b) Secret Leaking Embodiments

The second example illustrates that the attacker process may read the victim process's memory space directly.

Step-I: The attacker process may use mmap( ) syscall to pre-map a data page such that the virtual address $VA_0$ points to a data region on that page.

Step-II: The victim process may be scheduled to run and access the memory at address $VA_0$, which may be either an instruction fetch or a data load. This loads a TLB entry into the TLB.

Step-III: The hypervisor may de-schedule the victim vCPU, and the attacker vCPU may be scheduled to run on the same logical core. The hypervisor may set the TLB control field of the attacker's VMCB to TLB_CONTROL_DO_NOTHING (00 h) such that no TLB entries are flushed.

Step-IV: After being scheduled to run and loading data from $VA_0$, it is observed that the attacker process successfully loads the data from the victim's address space, thereby, compromising the victim's confidentiality. This is because the TLB entries created by the victim process are reused by the attacker process.

3. TLB Misuse within the Same vCPU Embodiments

When the victim VM has only one vCPU, the attacker process shares the vCPU with the victim process. In this case, TLB misuse is less straightforward. The TLB flush rules illustrated in Section C.3 (above) suggest that the hardware will automatically flush the entire TLB tagged by the victim VM vCPU's ASID when there is an internal context switch in the guest VM, which leaves no chance for the hypervisor to skip the TLB flush. As such, the hypervisor cannot directly misuse the TLB entries between two processes within the same vCPU. To address this challenge, presented herein are novel VMCB-switching embodiments to bypass the hardware-enforced TLB flush during the internal context switch.

a) Bypassing Hardware-Enforced TLB Flushes Embodiments

One key to bypassing the hardware-enforced TLB flush is to reserve the attacker process's TLB entries on one CPU core and then to migrate the vCPU to another CPU core. The internal context switch between the victim process and the attacker process is then performed on the second CPU core, which automatically flushes all TLB entries on the second logical core. Because the hypervisor isolates the first CPU core to prevent other processes from evicting its TLB entries, the TLB entries of the attacker processes are hence preserved. The hypervisor then migrates the vCPU back, with the victim process executing on it. The victim process will then misuse the TLB entries poisoned by the attacker process.

The challenges for bypassing the hardware-enforced TLB flush are two-fold: First, changing the vCPU affinity inside the victim VM leads to TLB flush for both the victim and attacker processes; however, such TLB flush can only be performed by a privileged process. Second, changing the CPU affinity outside the victim VM, i.e., from the hypervisor side, may easily evict the reserved TLB entries. Thus, traditional CPU schedule methods, such as taskset or sched_setaffinity, may not work.

b) VMCB-Switching Embodiments

Figure 2A:
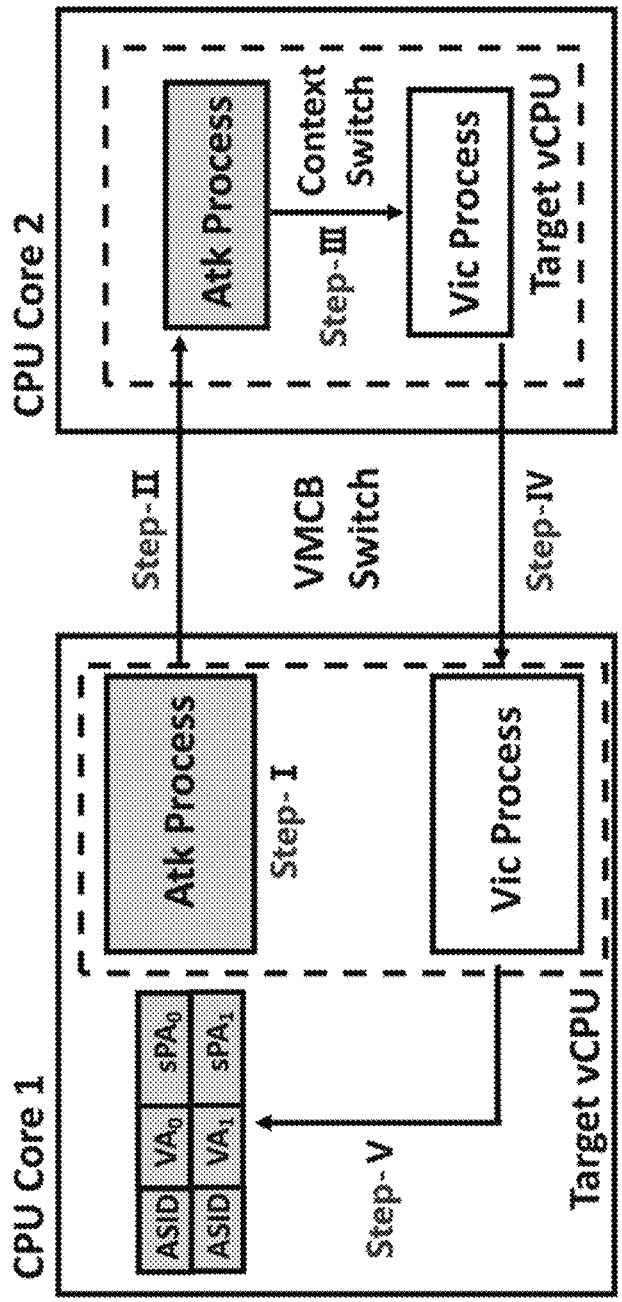
FIG. 2A illustrates (VMCB) switching steps used to bypass the hardware-enforced TLB flushes according to embodiments of the present disclosure.
Figure 2B:
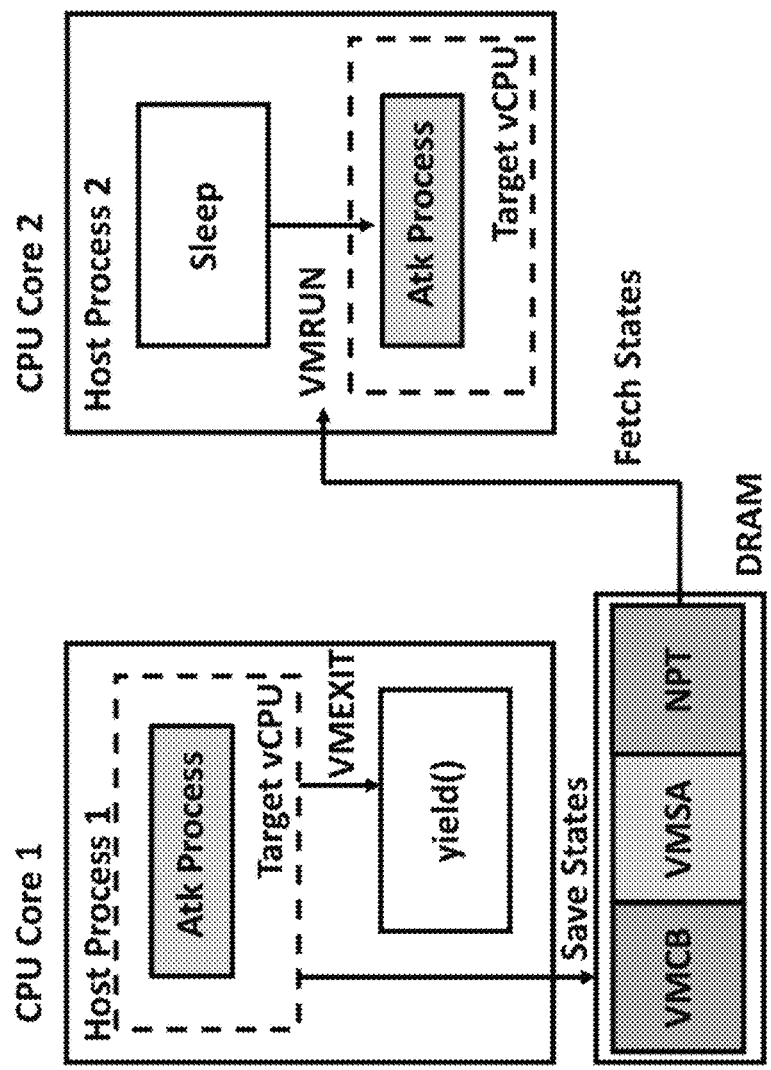
FIG. 2B depicts changing a vCPU's CPU affinity without TLB flush, according to embodiments of the present disclosure.

FIG. 2A and FIG. 2B illustrate how VMCB-switching may be used to bypass the hardware-enforced TLB flushes, according to embodiments of the present disclosure. FIG. 2A illustrates VMCB-switching steps, and FIG. 2B illustrates depicts changing a vCPU's CPU affinity without TLB flush.

Step-I: In one or more embodiments, the hypervisor first isolates the target vCPU hosted in a hypervisor process $HP_1$ on logical core $LC_1$ and prevents other processes from accessing $LC_1$, as well as its co-resident logical core on the same physical core. The hypervisor may also reserve another logical core $LC_2$ with an idle hypervisor process $HP_2$, e.g., to ensure that other processes will not evict the reserved TLB entries.

Step-II: After an attacker process poisons the targeted TLB entries, the hypervisor may trap the vCPU into an empty loop during an VMEXIT. Meanwhile, the hypervisor may let the idle process $HP_2$ on $LC_2$ to resume the attacker vCPU using its VMCB, VMSA pointer, and NPT structures. This is possible because the states of the attacker vCPU (e.g., registers, ASID, Nested CR3) are stored in the DRAM in encrypted form using either the hypervisor's memory encryption key (e.g., VMCB, NPT) or the guest VM's VM encryption key (e.g., VMSA). After resuming the attacker vCPU on $LC_2$, there are no valid TLB entries on $LC_2$, but the attacker process inside the attacker vCPU can continue execution after page table walks.

Step-III: The hypervisor may trap and trace changes to gCR3 to monitor the internal context switches on the attacker vCPU. Specifically, the hypervisor may intercept TRAP_CR3_WRITE VMEXIT and extract the gCR3 value in the EXITINFO1 field of VMCB. Since the inner context switch occurs on $LC_2$, no hardware-enforced TLB flush is triggered on $LC_1$ and, thus, the attacker process's TLB entries are preserved on $LC_1$.

Step-IV: After observing that a context switch from the attacker process to the victim process is scheduled, the hypervisor may switch the attacker vCPU back to $LC_1$, e.g., following a similar method as described in Step-II. The hypervisor may stop $HP_2$ on $LC_2$ and release $HP_1$ on $LC_1$ from the empty loop.

Step-V: After resuming execution on $LC_1$, the victim process first tries to execute its next instruction pointed by RIP in VMSA via a TLB lookup. The preserved TLB entries on $LC_1$ are unconditionally trusted by the hardware. After the victim process uses the attacker's TLB entries to execute instructions, some remaining TLB entries belonging to the attacker process may potentially disturb the execution of the victim process afterwards. Thus, the hypervisor can choose to perform a total TLB flush.

It is noted that the attacker process and the hypervisor may also breach confidentiality of the victim process in a reversed way, e.g., where the hypervisor reserves the victim process's TLB entries and lets the attacker process reuse TLB entries to exfiltrate secrets from the victim's address space.

4. CPUID-Based Covert Channel Embodiments

A third primitive embodiment was built for transmitting data between a hypervisor and an attacker process in the victim VM that is under the adversary's control. To do so, a CPUID-based covert channel was built so that network communication was not required. The adversary-controlled process may execute CPUID instructions to receive data or pass data to the hypervisor. In one or more embodiments, to send data to the hypervisor, the attacker process may trigger a CPUID with a reserved RAX value (e.g., 1234) to initiate a data transfer. The attacker process may then repeatedly trigger CPUID with RAX registers populated with the data to be transferred. Similarly, to receive data from the hypervisor, the attacker process may trigger a CPUID with another reserved RAX value (e.g., 1235). The hypervisor may retrieve the value of RAX and pass the data to GHCB's RAX field before VMRUN. The attacker process may then read the value of RAX after the CPUID instruction. Data received from the covert channel may be used as commands; the attacker process performs pre-defined actions (e.g., mmap memory page and read certain virtual address) in accordance with the command received. In experiments, the maximum transmission speed was 1.854 MB/s when using the 8-byte RAX register for data transmission. Other covert channels that make use of cache timing or AMD's way predictor may also be adopted as covert channels but may be less robust.

E. TLB Poisoning with Assisting Processes Embodiments

This section discusses a first variant of TLB poisoning attack embodiments, which are assisted by an unprivileged attacker process running in the victim VM. Following the threat model described in Section D.1 above, it is assumed that the attacker process is unprivileged and has limited access to system resources, such as procfs, networking, or any privileged system capabilities. This is practical, e.g., in scenarios where the adversary has an unprivileged user account on the victim VM, or an application with security vulnerabilities is remotely exploitable by the adversary. To simplify the attack, it is assumed that ASLR is disabled on the victim VM or that the attacker process can learn the VMA of the victim process. In practice, the attacker process may break ASLR using a CROSSLINE attack or any other existing method.

1. OpenSSH Embodiments

It is shown that, with the help of an unprivileged attacker process within a guest VM, an adversary may poison the TLB entries of a privileged victim process and then control its execution. The attack may be applied to OpenSSH and be used to bypass password authentication.

a) OpenSSH's Process Management Embodiments

Once a secure shell daemon (sshd) process, $P_d$, is launched during a system boot phase, $P_d$ runs in the background and listens to connections on SSH ports (e.g., port 22). The address space of $P_d$ is defined in the kernel by VMA data structures. Upon receiving a connection, $P_d$ forks an sshd child process, $P_c$, which performs a privilege separation (or privsep) by spawning another unprivileged process, $P_n$, to deal with the network transmission, but $P_d$ keeps the root privilege to itself to act as a monitoring process. Once a user is successfully authenticated, $P_n$ is terminated, and a new process $P_u$ is created under the new user's username. As discussed further below, in one or more TLB poisoning attack embodiments, an attacker process may take advantage of a victim process, which is the privileged child sshd process, $P_c$, to poison TLB entries.

b) Password Authentication Bypass Embodiments

The adversary may first initialize a SSH connection to a target VM and monitor gCR3 changes, e.g., by setting the CR3_WRITE_TRAP intercept bit in its VMCB. Once the SEV-ES VM receives the SSH packet from the adversary, the adversary may immediately observe a context switch (e.g., gCR3 change). The new process to run is the sshd child process $P_c$. In this way, the adversary may identify the gCR3 of $P_c$.

(1) Locate the shared library. The attacker process may first help the adversary to locate the gPA of the shared library. In one or more embodiments, pam_authenticate( ), which is a function of the shared library libpam.so.0 and is used by sshd for password authentication, may be targeted. pam_authenticate( ) returns 0 if the authentication succeeds. An adversary may use the attacker process to help locate the gPA of pam_authenticate( ) (denoted $gPA_{pam}$), e.g., by first synchronizing with the two colluding entities using the covert channel (described in Section D.4) and then causing pam_authenticate( ) to be called by the attacker process. The hypervisor may learn $gPA_{pam}$ by triggering NPFs.

(2) Track the victim's execution. The adversary may clear the Present bit of all pages and monitor NPFs after intercepting his SSH packet with the incorrect password. If an NPF of $gPA_{pam}$ is observed, this indicates to the adversary that the victim process is going to authenticate the password by calling pam_authenticate( ). The adversary may then pause the victim process by trapping the victim in the $gPA_{pam}$ NPF handler. This may be used to provide a time window for the attacker process to poison the TLB entries. It is noted that this step may be useful in real attacks as it provides an opportunity for the attacker process to poison the TLB entries right before the victim process accesses those poisoned TLB entries, i.e., before the poisoned TLB entries are evicted by other activities.

(3) Poison TLB entries. The adversary may then poison the TLB entries of the victim. Assuming that the virtual address of the instruction page containing pam_authenticate( ) in $P_c$ is $gVA_{pam}$ and that the adversary learns $gVA_{pam}$ in advance, $gVA_{pam}$ is predictable if ASLR is disabled. The adversary may also learn $gVA_{pam}$ by using any existing attack method. In embodiments, the adversary may target poisoning TLB entries indexed by $gVA_{pam}$. In one or more embodiments, the attacker process may first mmap a page with the virtual address to be $gVA_{pam}$. It is noted that $gVA_{pam}$ is only used in $P_c$, and the attacker process may assign this virtual address to a new instruction page. The attacker process may then copy the same instruction page as the victim into the new page and replace a few instructions of pam_authenticate (e.g., offset 0x5b0-0x65f of the binary, starting with test % rdi % rdi) with mov $0% eax and ret (0xb8 0x00 0x00 0x00 0x00 0xc3). The adversary may also schedule the attacker process on the same logical core as the victim process, e.g., by changing the CPU affinity of the vCPU. The attacker process may then repeatedly access this instruction page in a loop to preserve the TLB entries.

(4) Bypass authentication. After the attacker process poisons the TLB entries of pam_authenticate( ), the adversary may directly resume $P_c$ without a TLB flush. Recall that, in step (2), $P_c$ was paused prior to a page table walk to resolve $gPA_{pam}$. The adversary may resume $P_c$ without handling this page table walk in order to force $P_c$ to reuse the poisoned TLB entries. This way, when $P_c$ calls pam_authenticate( ), it will execute the instruction in the attacker's address space. Therefore, the function will directly return a 0 in EAX, thus, allowing an arbitrary user login.

2. Evaluation

Experimental settings comprise: an AMD EPYC™ 7251 CPU with 8 physical cores; a SEV-ES VM downloaded from the AMD SEV repository; a host kernel version sev-es-v3; a QEMU version sev-es-v12; an OVMF version sev-es-v27; a victim VM comprising SEV-ES-enabled VMs with 4 vCPUs, 4 GB DRAM, and 30 GB disk storage; OpenSSH version OpenSSH_7.6p1; and OpenSSL version 1.0.2n. The attack was repeated 20 times and all attacks successfully bypassed password authentication and could log in with incorrect passwords.

Figure 5:
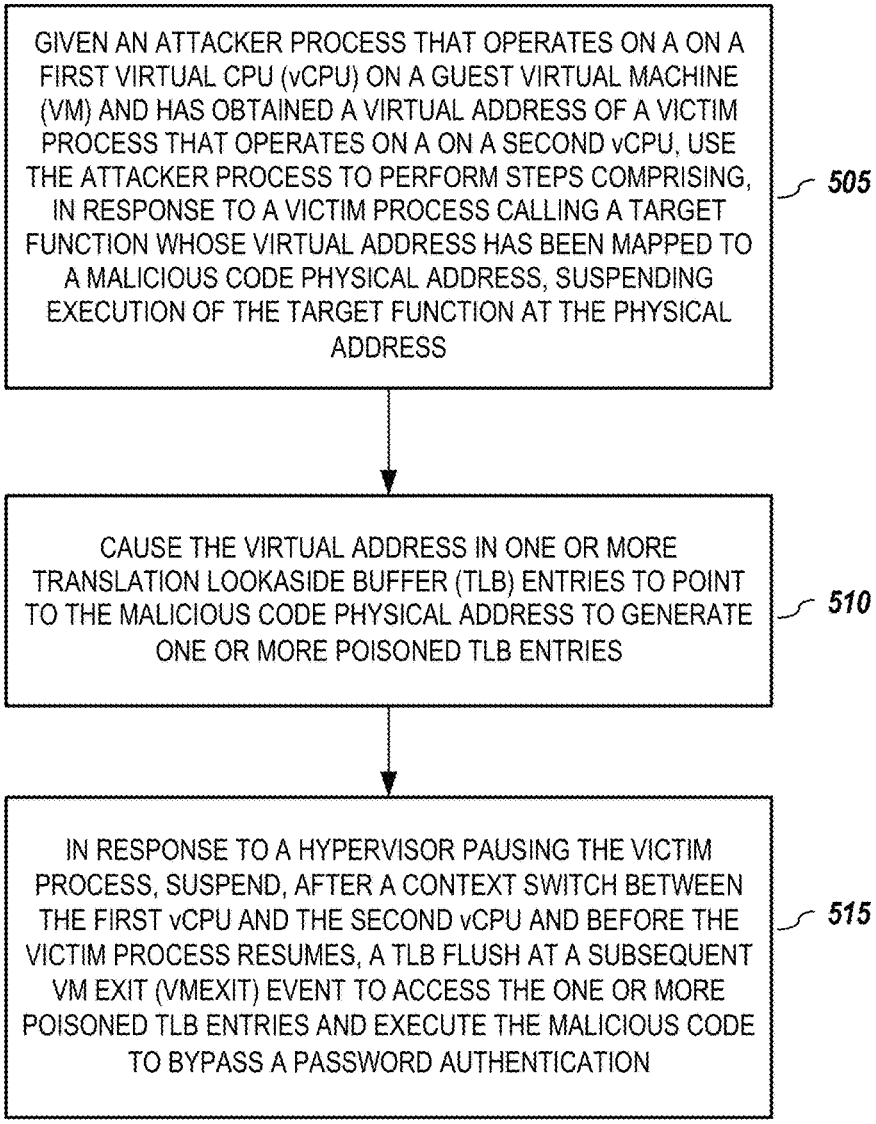
FIG. 5 is a flowchart illustrating a hypervisor-controlled attack process for manipulating a privileged victim process's execution to bypass password authentication, according to embodiments of the present disclosure

FIG. 5 is a flowchart illustrating a hypervisor—controlled attack process for manipulating a privileged victim process's execution to bypass password authentication, according to embodiments of the present disclosure. In one or more embodiments, the hypervisor-controlled attack process (500) for manipulating a privileged victim process's execution may start by using an attacker process to perform steps comprising, in response to a victim process calling a target function whose virtual address has been mapped to a malicious code physical address, suspending (505) execution of the target function at the physical address. The hypervisor may use one or more NPF events to learn the physical address of the target function, e.g., by manipulating page table entries to trigger an NPF event.

In one or more embodiments, the attacker process is an unprivileged process that may operate on a on a vCPU on a guest VM and obtain a virtual address of the victim process. Conversely, the victim process, e.g., a privileged child secure shell daemon process, may operate on a on a different vCPU. In one or more embodiments, the hypervisor may schedule both vCPUs at a same logical core. In one or more embodiments, the attacker process may cause (510) the virtual address in one or more TLB entries to point to the malicious code physical address to generate one or more poisoned TLB entries.

Once a hypervisor pauses the victim process, the attacker process may suspend (515) a TLB flush at a subsequent VMEXIT event to access the one or more poisoned TLB entries and execute the malicious code to bypass a password authentication. In one or more embodiments, the attacker process may suspend the TLB flush, e.g., after a context switch between the two vCPUs and before the victim process. Further, the hypervisor may execute CPUID instructions to trigger one or more VMEXIT events to initiate transmission or receipt of covert data in a CPUID-based covert data channel.

F. TLB Poisoning without Assisting Processes Embodiments

This section demonstrates that TLB poisoning attacks may work even without employing an attacker process in the victim VM. Intuitively, when attacker and victim processes share similar virtual address spaces, TLB misuse may happen between these processes without direct control of either process.

One or more embodiments target fork( ) a system call that is used to create new processes and that is widely used in server-side applications, such as OpenSSH, sftp, Nginx, and Apache web server, to serve requests from different clients. Forked child processes have a high probability of sharing a very similar virtual memory area with a majority of their virtual address space layout overlapping. Even if the VM's administrator chooses to enable ASLR, the same VMA randomization is applied to the parent process and all child processes, which gives the adversary the chance to conduct TLB poisoning despite the unpredictable VMA. This similarity of address spaces of forked processes has been exploited in memory hijacking attacks.

Attack scenarios. Similar to the previous scenario that highlights a TLB poisoning attack embodiment against an SSH server, Dropbear SSH, which is a lightweight open-source SSH server written in C and released frequently since 2003, was targeted. The more popular OpenSSH was not chosen because it alters its memory address space in all its children processes that serve incoming connections (by calling exec( )). However, this mechanism is typically only observed in OpenSSH and OpenBSD. Other network applications like Dropbear SSH and Nginx do not change their virtual memory layout for different connections.

It was assumed that the targeted Dropbear SSH server application is free of memory safety vulnerabilities and timing channel vulnerabilities. It was further assumed that the binary of the Dropbear Server application is known by the adversary, and that the username of a legitimate user is known by the adversary—a practical assumption as usernames are not considered secrets. To simplify the attack, it was also assumed that the two processes are scheduled on two different vCPUs, which makes the attack easier to perform; otherwise, a VMCB-switching approach embodiment may be required.

1. Poison TLB Entries Between Connections Embodiments

Two SSH connections are considered: a connection from the adversary, which is served by the process $P_{atk}$ that is forked from the DropSSH server daemon, and another connection from a legitimate user, which is served by the process $P_{vic}$. One attack goal is to allow the attacker process to temporarily use the victim process's TLB entries and circumvent password authentication.

Regular login procedures. After the login password packet is received by the victim VM, $P_{vic}$ calls svr_auth_password( ) to validate the password. As shown in Listing 2 below, the password encryption function in the POSIX C library crypt( ) is called to generate a hash of the user-provided password. The result may be stored in a buffer called testcrypt. The buffer storing the plaintext of the password may be immediately freed. Then, the hash of the user-provided password may be compared with the stored value in the system file using constant_time_strcmp( ), which returns 0 if these two strings are identical. If the user-provided password is correct, $P_{vic}$ takes the correct-password branch, which calls send_msg_userauth_success( ). Otherwise, the incorrect password branch is taken.

| Listing 2: Code snippet of svr_auth_password( ). |
|---|
| 1   void svr_auth_password (int valid_user ) { |
| 2       char * passwdcrypt = NULL; |
| 3       // store the crypt from / etc/ passwd |
| 4       char * testcrypt = NULL; |
| 5       // store the crypt generated from the password sent |
| 6       ... |
| 7       // ** Execution Point 1 (NPF) |
| 8       if (constant_time_strcmp (testcrypt, passwdcrypt) == 0) |
|          { |
| 9           // successful authentication |
| 10          // ** Execution Point 2 (NPF) |
| 11          send_msg_userauth_success ( ); |
| 12          } ... |
| 13  } |

Attack overview. Test results demonstrate that by breaking the TLB isolation, the attacker process $P_{atk}$ may bypass password authentication by using even an incorrect password. Specifically, the virtual addresses of the testcrypt buffer are usually the same for both $P_{atk}$ and $P_{vic}$, which is empirically evaluated later. $<gVA_{pwd}, sPA_{vic}>$ denotes the TLB entry owned by $P_{atk}$, which caches the mapping from the virtual address of the testcrypt buffer to the system physical address that stores the hashed password used in $P_{vic}$. One goal is to ensure the TLB entry $<gVA_{pwd}, sPA_{vic}>$ is not flushed when $P_{atk}$ executes constant_time_strcmp( ). In this way, $P_{atk}$ may re-use the testcrypt of $P_{vic}$ to circumvent password authentication.

Figure 3:
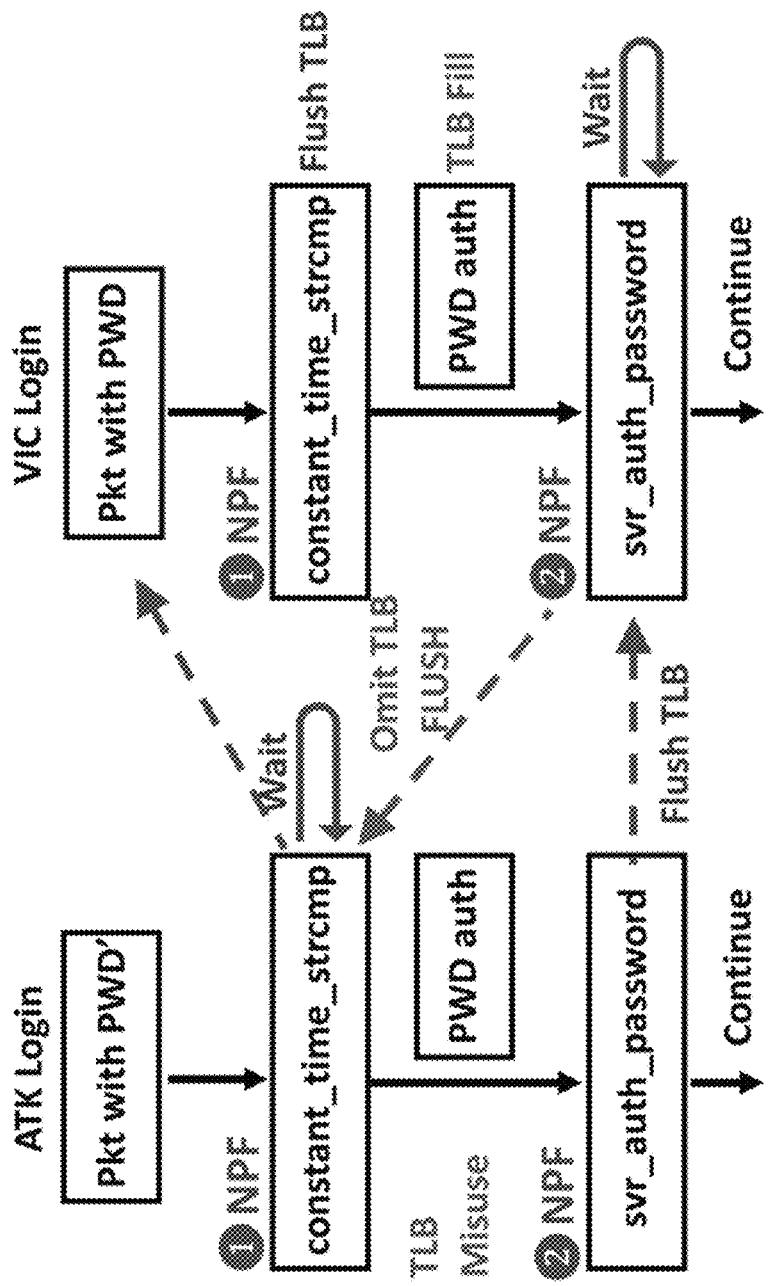
FIG. 3 depicts an overview of an exemplary attack steps to bypass password authentication, according to embodiments of the present disclosure.

Some Key Challenges. One key challenge in this attack is to ensure that only necessary TLB entries are preserved. Otherwise, later TLB entries may flush those necessary TLB entries. To address the challenge, the TLB poisoning may be performed at the proper execution point. As shown in FIG. 3, which depicts an overview of an exemplary attack steps to bypass password authentication, according to embodiments of the present disclosure, the adversary may locate the execution points right before and after the password authentication (e.g., constant_time_strcmp( )), which may be accomplished using the NPF controlled channels. It is assumed that the guest physical addresses of the instruction page where the svr_auth_password( ) and the constant_time_strcmp( ) are located are, respectively, $gPA_1$ and $gPA_2$. The adversary may first trap the attacker process in an empty loop when handling the NPF of $gPA_2$ (execution point 1), which means $P_{atk}$ is about to call constant_time_strcmp( ). Then, the adversary does not interrupt $P_{vic}$ until $P_{vic}$ also reaches the NPF of $gPA_2$ (execution point 1). When handling this NPF, the adversary may trigger a complete TLB flush. $P_{vic}$ may then continue execution until it finishes the password authentication and try to return to svr_auth_password( ). An NPF of $gPA_1$ (execution point 2) is observed, and the adversary traps $P_{vic}$. Meanwhile, the adversary may release the attacker process and skip the TLB flush. All TLB entries used by $P_{vic}$ during the execution of constant_time_strcmp( ) may thus be preserved in the TLB, including TLB ($gVA_{pwd}, sPA_{vic}$). After the attacker process completes constant_time_strcmp( ), passes the password check, and reaches execution point 2, the adversary may trigger a complete TLB flush, e.g., to avoid unnecessary TLB misuse, and release $P_{vic}$. Both $P_{atk}$ and $P_{vic}$ may continue execution as normal, and no traces are left in the kernel message.

Figure 6:
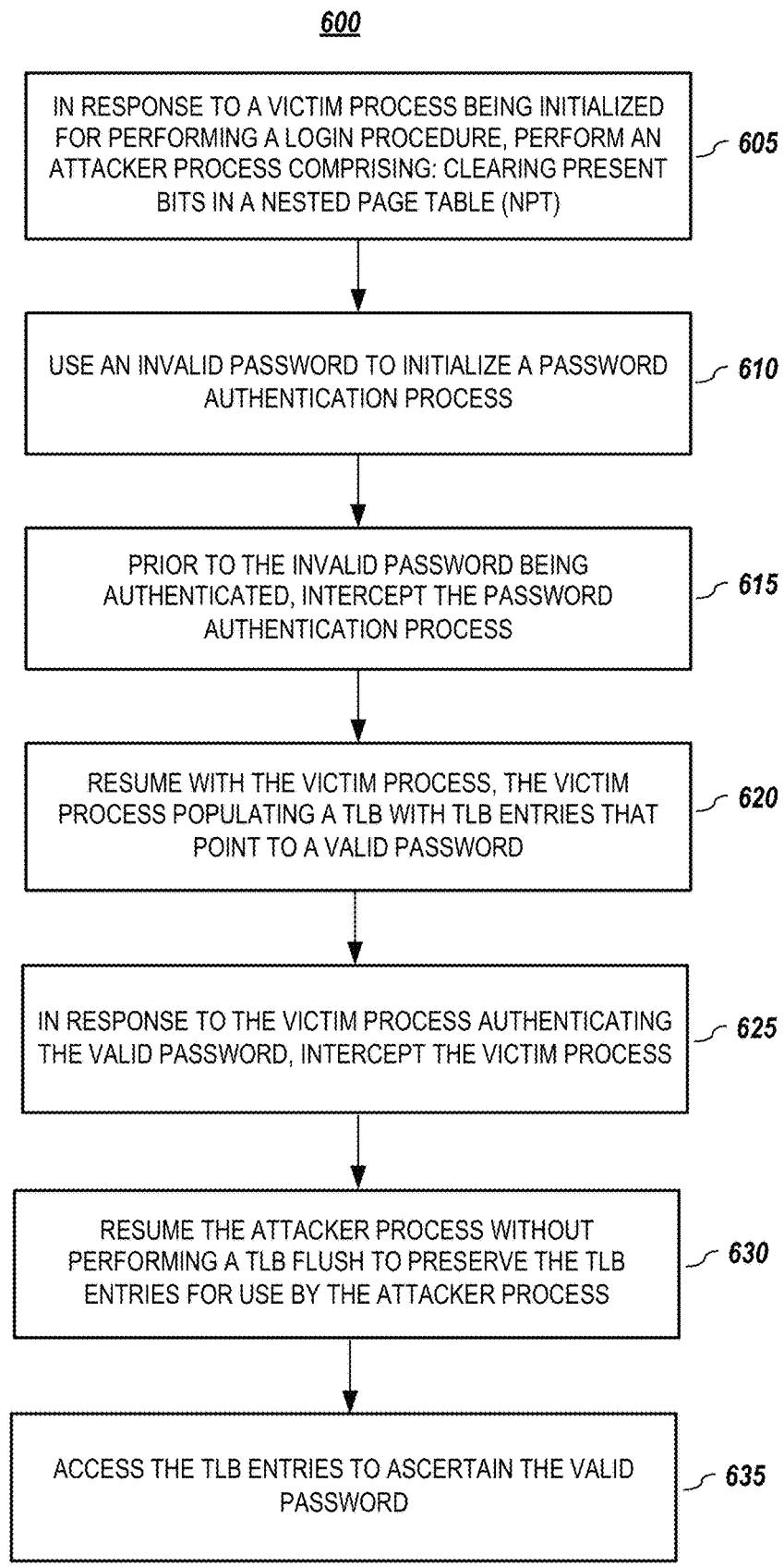
FIG. 6 is a flowchart illustrating a non-hypervisor-controlled translation lookaside buffer TLB poisoning process for attacking a network application, according to embodiments of the present disclosure.

FIG. 6 is a flowchart illustrating a non-hypervisor-controlled translation lookaside buffer TLB poisoning process for attacking a network application, according to embodiments of the present disclosure. In one or more embodiments, process (600) for attacking a network application may start by performing (605) an attacker process. The attacker process may comprise clearing Present bits in an NPT, e.g., in response to a victim process being initialized, e.g., by an SSH connection that represents a child process that has been forked from an SSH server daemon, for performing a login procedure. The attacker process may further comprise using an invalid password to initialize (610) a password authentication process, e.g., by using a different second SSH connection.

In one or more embodiments, the victim process may operate on one vCPU, and the attacker process may operate on a different vCPU. Prior to the invalid password being authenticated, the password authentication process may be intercepted (615) and the victim process may resume, e.g., to populate (620) a TLB with TLB entries that point to a valid password. In one or more embodiments, intercepting may comprise, in response to clearing the Present bits, triggering NPF events to locate a physical address that comprises an instruction for a password comparison function. Similarly, a password validation process may be intercepted by using NPF events to locate a physical address that comprises an instruction for the password validation function.

In one or more embodiments, in response to the victim process authenticating the valid password, the victim process may be intercepted (625), and the attacker process may resume (630) without performing a TLB flush, thereby, preserving the TLB entries for use by the attacker process. The attacker process ma then reuse TLB entries, e.g., to read instructions of the victim process or execute instructions of the victim process. In one or more embodiments, the TLB flush may involve a context switch between two virtual vCPUs or a world switch between a guest virtual machine and a hypervisor.

In one or more embodiments, the TLB entries may be accessed (635) to ascertain the valid password, e.g., by reading a hash of the valid password. It is noted that once the valid password has been ascertained and, e.g., prior to the victim process resuming execution, at least some of the TLB entries may be flushed in this manner.

2. End-to-End Attack Embodiments

An adversary may follow the following steps to carry out an end-to-end attack:

(1) Monitor network traffic. Even if the adversary cannot directly learn the content of encrypted network packets, the adversary may inspect incoming and outgoing network packets through the unencrypted metadata (e.g., destination address, source address, or port number). The adversary may continuously monitor network traffic to identify the SSH handshake procedure. Once the adversary identifies a client_hello packet sent by a legitimate user, the adversary may trap that packet and send a client_hello packet from a remote machine controlled by the adversary to the victim VM. Once this client_hello packet reaches the victim VM, the adversary may resume processing the client_hello packet sent by the legitimate user. Thus, the victim VM may receive two connection requests, one from the adversary and another from the legitimate user.

(2) Monitor fork( ) and gCR3 changes. Next, the adversary may locate the gCR3 of the forked child processes. During the victim VM's booting period, the adversary may continuously monitor gCR3 changes, e.g., by setting the CR3_WRITE_TRAP intercept bit in the VMCB. As a result, gCR3 changes may cause an automatic VMEXIT with the new gCR3 value stored in VMEXIT EXITINFO. After receiving the two SSH connection packets, the Dropbear Daemon may fork twice to generate child processes for the adversary's connection and the legitimate user's connection. The forked child process for the adversary's connection is referred to as $P_{atk}$, whose gCR3 is $gCR3_{atk}$. The forked child process for the legitimate user's connection is referred to as $P_{vic}$, whose gCR3 is $gCR3_{vic}$. The adversary may identify $gCR3_{atk}$ and $gCR3_{vic}$ by correlating them with the received client_hello packets.

(3) Monitor NPFs to locate the target gPAs. The adversary may try to log in by sending an arbitrary password. The legitimate user logs in by sending a correct password. The adversary triggers NPFs by clearing the Present bits in the NPT, when the encrypted SSH packets that contain the passwords are observed. A sequence of NPFs for $P_{atk}$ and a sequence of NPFs for $P_{vic}$ may be observed. The adversary may also collect additional information (e.g., NPF EXITINFO2) along with the NPF VMEXITs, which reveals valuable information. For instance, the adversary may learn that the NPF is caused by write/read access, user/kernel access, code read, or page table walks. The adversary may also clear (e.g., periodically, every 50 NPFs) Present bits to finetune the NPF sequence. Since the Dropbear's binary is known to the adversary, the adversary may learn the NPF patterns offline to locate the gPA of svr_auth_password( ) (denoted $gPA_1$) and the gPA of the first instruction in constant_time_strcmp( ) (denoted $gPA_2$). The features used in pattern recognition may be, for example, the sequence of NPFs and their error code. During an attack, the adversary may use the recognized pattern to locate $gPA_1$ and $gPA_2$.

(4) Skip TLB flush. An adversary may continuously monitor $P_{atk}$ and $P_{vic}$. When observing the NPF of $gPA_2$ in $P_{atk}$, the adversary may trap $P_{atk}$ in an empty loop and clear the Present bit of all pages. When observing the NPF of $gPA_2$ in $P_{vic}$, the adversary may clear the Present bit for all memory pages and perform a complete TLB flush. The adversary may trap $P_{vic}$ when observing the NPF of $gPA_1$. $P_{atk}$ may then resume, and the adversary may skip the TLB flush. $P_{atk}$ uses the preserved TLB entries from $P_{vic}$ to to read the password hash from the testcrypto in the address space of $P_{vic}$, which enables a successful login using an incorrect password. To avoid further TLB pollution, the adversary may then force a complete TLB flush and resume the victim process. Then, both $P_{atk}$ and $P_{vic}$ may resume regular execution.

3. Evaluation

Experiments were performed on a workstation with an AMD EPYC™ 7251 Processor CPU with 8 SMT-enabled physical cores. The VMs, including the victim VM and the training VMs used in this section were SEV-ES-enabled VMs with four vCPUs, 4 GB DRAM, and 30 GB disk storage. The OS software, QEMU (a machine emulator/hypervisor), and the UEFI (Unified Extensible Firmware Interface) image were the same as in Section E.2. ASLR was enabled in the SEV-ES-enabled VMs by setting the parameter in /proc/sys/kernel/randomize_va_space to 2. The source code of Dropbear was downloaded from Github (commit: 846d38fe4319c517683ac3df1796b3bc0180be14). The Dropbear SSH Server was configured as the default setting. The Dropbear SSH Server was bonded to Port 22. One minor non-default setting to assist the attack was that $P_{atk}$ and $P_{vic}$ were forced to execute on different vCPUs of the victim VM. It is noted that this setting improved the success rate of the attack but is not necessary in practical attacks.

Figures 4A, 4B:
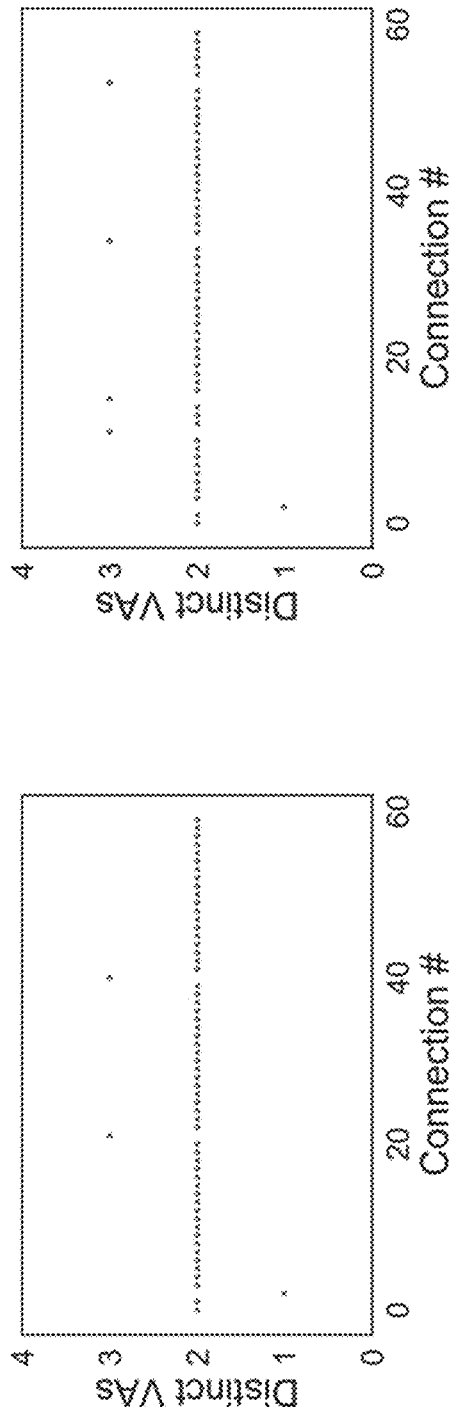
FIG. 4A and FIG. 4B depict variations of the virtual address of test crypto for ten connections per second and one connection per second, respectively, according to embodiments of the present disclosure.

Buffer address variation. The variation of the virtual address of testcrypto under different connection ratios was first evaluated. In the training VM, the Dropbear server was modified to print the virtual address of testcrypto to the console after each connection. Then, a simple script was used to initiate new SSH connections, the correct password was sent to login, the virtual address of testcrypto was obtained, and the current SSH connection was ended. In total, 120 connections were collected. For the first 60 connections, the time interval between two contiguous connections was set to 0.1 second. For the second 60 connections, the time interval was set to 1 second. As shown in FIG. 4A, when the time interval is set to 0.1 seconds, although 3 different virtual addresses of the testcrypto are observed, the virtual address of testcrypto remains the same in 57 of the total 60 connections. As shown in FIG. 4B, when the time interval is set to 1 second, the virtual address of testcrypto remains the same in 55 of the total 60 connections. The experimental results show that the virtual addresses for testcrypto are relatively stable for different connections, which enables the adversary to poison the TLB entries of the testcrypto buffer between two connections.

Pattern matching. The pattern matching performance was evaluated as follows: The above attack steps were repeated 100 times, and, each time, pattern matching was performed on-the-fly. In 98 of 100 trials, the adversary was able to correctly recognize the pattern and locate the gPA. The average time used to locate the pattern was 0.10137 seconds with a standard deviation of 0.02460 seconds.

End-to-end attacks. The success rate of end-to-end attacks was evaluated as follows: The adversary conducted end-to-end attacks in the victim VM and used an incorrect password for SSH connections. The adversary repeated the attacks 20 times, and in 17 connections, the adversary was able to log in with the incorrect password. Two reasons may account for the 3 failed attempts. First, the reserved TLB entries may have been evicted before use and, second, the presence of false positives in pattern matching. However, it is understood that an adversary may always repeat attacks the next time a legitimate user logs in.

G. Discussion and Countermeasure Embodiments

This section discusses, applications of TLB poisoning attacks embodiments on SEV-SNP, their differences compared to known attacks, and various countermeasures.

1. Comparison with Known Attacks

Previous works break confidentiality and/or integrity of SEV by replacing unprotected I/O traffic, manipulating NPT mapping, and using unauthenticated encryption. SEV-SNP may mitigate these by using a Reversed Map table (RMP), which establishes a unique mapping between a system physical address and either a guest physical address or a hypervisor physical address. The RMP also records the ownership of each system physical address (e.g., a hypervisor page, a hardware page, or a SEV-SNP VM's page) as well as the ASID. For SEV-SNP VM, the RMP approach checks the correctness and ownership after a nested page table walk. Once ownership is verified, mapping between the guest virtual address and the system physical address may be cached in the TLB. This ownership check prevents the hypervisor from remapping the guest physical address to another system physical address and, thus, prevents attacks that require manipulation of the NPT. Meanwhile, the RMP restricts the hypervisor's ability to write to the guest VM's memory page, which mitigates attacks relying on unauthenticated encryption and unprotected I/O operations.

In contrast, this patent document demystifies how TLB isolation is performed in SEV and demonstrates security risks that hypervisor-controlled TLB flushes may pose. TLB poisoning attacks by themselves do not rely on the known vulnerabilities of SEV and SEV-ES, such as lack of authenticated memory encryption, lack of NPT protection, and lack of I/O protection, nor does RMP alone prevent TLB poisoning attacks.

2. Countermeasure Embodiments

TLB poisoning attacks affect SEV and SEV-ES servers, including all first and second generation EPYC™ server CPUs (e.g., Zen 1 and Zen 2 architectures). Older processors may use a microcode patch to enforce a TLB flush during VMRUN for all SEV/SEV-ES vCPUs. From the software side, to mitigate TLB poisoning attacks, it may be recommended that all network-related applications (e.g., HTTPS, FTP, and SSH server) use exec( ) to ensure a completely new address space for a new connection.

re-exec( ) Scheme Embodiments. In network applications, the sshd process uses the fork( ) commend to generate a child process to handle a new connection. The created child processes produced by fork mechanism typically have VMAs that are similar to those of their parent processes. An adversary may exploit this circumstance to facilitate TLB poisoning attacks.

In one or more countermeasure embodiments, TLB poisoning attacks may be mitigated by taking advantage of a re-exec scheme to introduce freshness into the VMA of a child processes to cause VMAs of child processes to be different from those of parent processes. In one or more embodiments, this may be accomplished by the following process that utilizes a re-exec( ) scheme to successfully thwart TLB poisoning attacks.

Step 1—A network application's daemon process (denoted $P_d$), which may be launched during system boot, may run in the background and listen to connections on certain ports, e.g., port 22 for SSH. The address space of daemon process $P_d$ may be defined in the kernel by VMA data structures. In one or more embodiments, upon receiving a connection request, the daemon process $P_d$ may fork an SSHD child process, $P_c$.

Step 2—$P_c$ itself may call an exec( ) command, i.e., a re-exec( ). After re-exec( ), once ASLR is enabled, e.g., on a Linux system, ASLR may randomize the VMA of the child process, $P_c$, to ensure a new address space for the connection. Thus, as illustrated in Section F.1 above, virtual addresses of the secret "testcrypt" may also vary for different connections, thereby, successfully thwarting a TLB poisoning attack.

Step 3—The daemon process $P_d$ may repeat Step 2, e.g., when there is a new connection.

It is noted that the above process is only one example of how to implement the re-exec scheme according to various embodiments herein. As a person of skill in the art will appreciate that other implementation are possible without deviating from the true spirit of this particular countermeasure.

Figure 7:
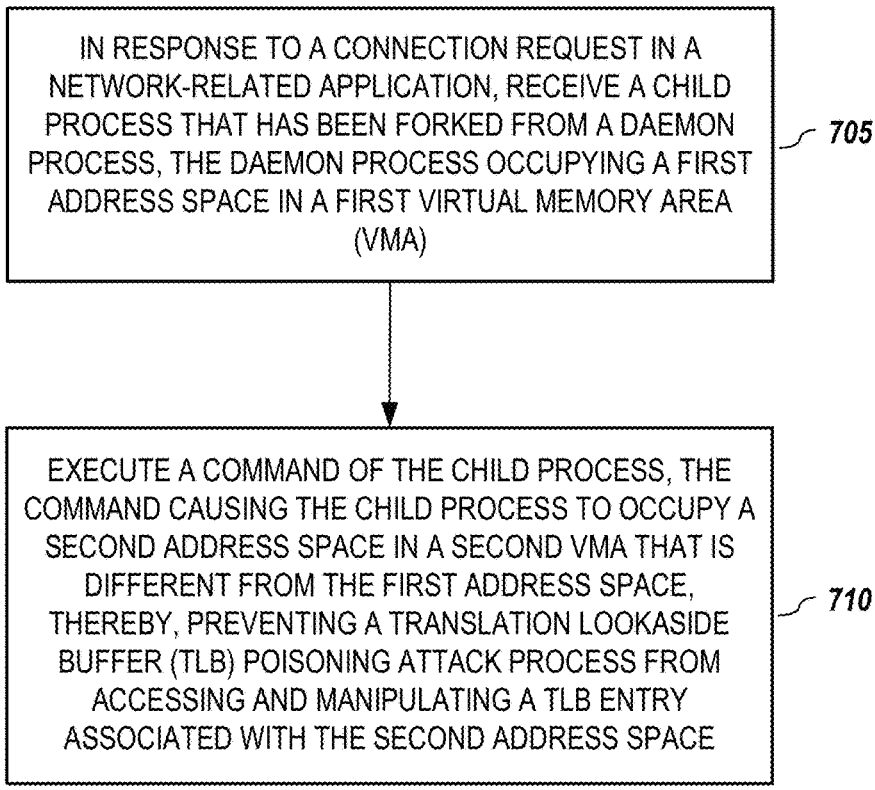
FIG. 7 is a countermeasure against a TLB poisoning attack, according to embodiments of the present disclosure.

FIG. 7 is countermeasure against TLB poisoning attacks, according to embodiments of the present disclosure. In one or more embodiments, in response to a connection request in a network-related application, a child process that has been forked from a daemon process may be received (705), the daemon process occupying a first address space in a first VMA. A command of the child process may be executed (710), such that the command causes the child process to occupy a second address space in a second VMA that is different from the first address space. Advantageously, this prevents a TLB poisoning attack process from accessing and manipulating a TLB entry associated with the second address space.

It is understood that the command may be an exec( ) command, and the daemon process that forks the child process, e.g., an SSHD child process, may also call an exec( ) command. Further, the daemon process, which may be launched during system boot, may run in the background and monitor connections on one or more ports.

In one or more embodiments, the virtual address associated with a system physical address of a buffer that comprises a hash of a user-provided password may be altered to cause the virtual address to be different for different connections. Finally, the child process and/or the daemon process may have an address space that is defined in a kernel, e.g., a Linux kernel that may enable ASLR to perform the randomization.

TLBreach Flushing Embodiments. In one or more embodiments, TLB poisoning attacks may be mitigated by utilizing a hardware-enforced TLB flush scheme. For example, each time a VMRUN occurs, hardware may enforce a TLB flush for SEV-enabled VM's ASID. In this manner, previous TLB entries from other processes inside the VM may be flushed to prevent a potential TLB misuse. In embodiments discussed above in Section E, the hardware may force a TLB flush even if an adversary chooses to skip the TLB in Step (4) in Section E.1b) to ensure that those poisoned TLB entries are forced to be evicted before the victim process continues execution. Similarly, in embodiments discussed above in Section F, to thwart a TLB poisoning attack, the hardware may force a TLB flush even if an adversary chooses to skip the TLB in Step (4) in Section F.2.

FIG. 8 is a countermeasure against a TLB poisoning attack utilizing a hardware-enforced TLB flush process for mitigating hypervisor—controlled TLB poisoning attacks, according to embodiments of the present disclosure. In one or more embodiments, in response to an event (e.g., VMRUN) in an SEV-enabled victim VM, process (800) may cause hardware to enforce (805) a TLB flush for the victim VM's ASID. Advantageously, this prevents a victim process, especially a privileged victim process, from accessing one or more poisoned TLB entries that may, otherwise, be manipulated by an unprivileged attacker process to bypass a password authentication. As a result, the victim process may be prevented from using the poisoned TLB entries and executing malicious code, e.g., by preventing a hypervisor from using the attacker process to cause the victim process to access and use poisoned TLB entries to read or execute of the victim process.

In one or more embodiments, the hypervisor may be prevented from controlling the attacker process to cause the victim process to use poisoned TLB entries after, e.g., a context switch between the first vCPU and the second vCPU or a VM exit event. It is understood that a malicious hypervisor may launch an application that comprises one or more security vulnerabilities that enable remote access to the attacker process, e.g., an attacker process that operates on a vCPU on the victim VM, while the victim process may operate on a different vCPU on the victim VM. It is further understood that, in one or more embodiments, the unprivileged attacker process may operate in the victim VM and be associated with an unprivileged user account on the victim VM.

In one or more embodiments, an attacker process may generate poisoned TLB entries by performing steps comprising (1) mapping a virtual address of a target function to a malicious code physical address; (2) in response to the victim process calling the target function, halting the victim process to access a virtual address in one or more TLB entries; and (3) manipulating the virtual address to point to the malicious code physical address.

H. Some Related Work

Several design flaws of AMD SEV have been reported since its debut in 2016, including unencrypted VMCB, unprotected I/O interface, unprotected memory mapping, unauthenticated memory encryption, and unauthenticated ASID.

Unencrypted VMCB. An unencrypted VMCB leaves SEV vulnerable to numerous attacks since the VM's states (e.g., registers) are saved in plaintext during a traditional world switch in AMD-V under the assumption that the hypervisor is trusted. To mitigate these attacks, AMD released SEV-ES, the second generation of SEV that encrypts the sensitive portions of the VMCB and stores them into the VMSA during the world switch.

Lack of memory integrity. Most of other attacks can work on SEV-ES. Some attacks involve unencrypted I/O operations on SEV and SEV-ES. On SEV, peripheral devices (e.g., disk, the network interface card) are not supported to directly read/write guest VMs' memory with the corresponding $K_{vek}$. Thus, an additional buffer area is reserved and maintained by the guest VM, which provides an interface for the hypervisor to generate encryption/decryption oracles during I/O transmission. Other attacks involve memory mapping problems caused by hypervisor-controlled nested page tables on SEV.

Unauthenticated ASID. Crossline attacks involve ASID misuse and the "Security-by-Crash" principle of AMD SEV and SEV-ES. ASID is used as tags in TLB entries and cache lines, and also the identifier of memory encryption keys in AMD-SP. However, the hypervisor is in charge of the ASID management. AMD relies on the Security-by-Crash principle to prevent ASID misuse; it is expected that an incorrect ASID will immediately crash the VM. However, it has been shown showed that by assigning the ASID of a victim VM to a helper VM, an adversary may extract the victim VM's arbitrary memory block with the PTE format. Crossline attacks are stealthy, but NPT page remapping is still required.

Page-fault side channels. Page-fault side channels are widely used in many attacks against SEV. The guest VM maintains its own guest page table, which transfers guest virtual address to guest physical address and is encrypted and protected by SEV. The lower nested page table is transparent to and maintained by an untrusted hypervisor. The hypervisor can easily track the victim VM's execution paths by clearing the Present bit in the lower NPT pages. Moreover, NPFs also reveal valuable information to the hypervisor (e.g., write/read access and user/privileged access). Such information may be actively gathered by the hypervisor and used to locate both the time point and the physical address of sensitive data. The controlled-channel methods in theory should still work on SEV-SNP.

I. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a CPU or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 9:
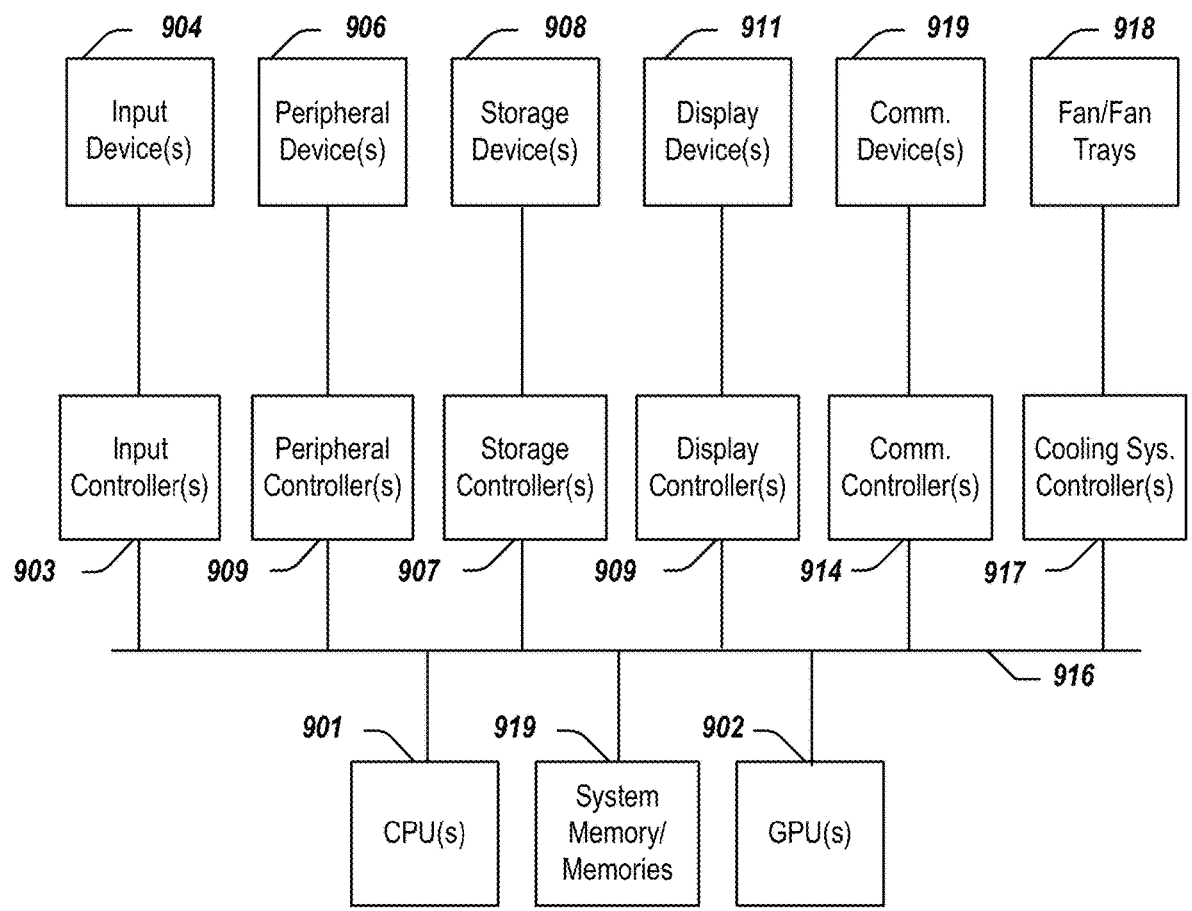
FIG. 9 depicts a simplified block diagram of a computing device/information handling system, according to embodiments of the present disclosure.

FIG. 9 depicts a simplified block diagram of an information handling system (or computing system), according to embodiments of the present disclosure. It will be understood that the functionalities shown for system 900 may operate to support various embodiments of a computing system—although it shall be understood that a computing system may be differently configured and include different components, including having fewer or more components as depicted in FIG. 9.

As illustrated in FIG. 9, the computing system 900 includes one or more CPUs 901 that provides computing resources and controls the computer. CPU 901 may be implemented with a microprocessor or the like, and may also include one or more graphics processing units (GPU) 902 and/or a floating-point coprocessor for mathematical computations. In one or more embodiments, one or more GPUs 902 may be incorporated within the display controller 909, such as part of a graphics card or cards. Thy system 900 may also include a system memory 919, which may comprise RAM, ROM, or both.

A number of controllers and peripheral devices may also be provided, as shown in FIG. 9. An input controller 903 represents an interface to various input device(s) 904. The computing system 900 may also include a storage controller 907 for interfacing with one or more storage devices 908 each of which includes a storage medium such as magnetic tape or disk, or an optical medium that might be used to record programs of instructions for operating systems, utilities, and applications, which may include embodiments of programs that implement various aspects of the present disclosure. Storage device(s) 908 may also be used to store processed data or data to be processed in accordance with the disclosure. The system 900 may also include a display controller 909 for providing an interface to a display device 911, which may be a cathode ray tube (CRT) display, a thin film transistor (TFT) display, organic light-emitting diode, electroluminescent panel, plasma panel, or any other type of display. The computing system 900 may also include one or more peripheral controllers or interfaces 905 for one or more peripherals 906. Examples of peripherals may include one or more printers, scanners, input devices, output devices, sensors, and the like. A communications controller 914 may interface with one or more communication devices 915, which enables the system 900 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 900 comprises one or more fans or fan trays 918 and a cooling subsystem controller or controllers 917 that monitors thermal temperature(s) of the system 900 (or components thereof) and operates the fans/fan trays 918 to help regulate the temperature.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A hypervisor-controlled attack method for manipulating a privileged victim process's execution to bypass password authentication:
    given an attacker process that operates on a first virtual CPU (vCPU) on a guest virtual machine (VM) and has obtained a virtual address of a victim process that operates on a second vCPU, using the attacker process to perform steps comprising:
    in response to a victim process calling a target function whose virtual address has been mapped to a malicious code physical address, suspending execution of the target function at the physical address;
    causing the virtual address in one or more translation lookaside buffer (TLB) entries to point to the malicious code physical address to generate one or more poisoned TLB entries; and
    in response to a hypervisor pausing the victim process, suspending, after a context switch between the first vCPU and the second vCPU and before the victim process resumes processing, a TLB flush at a subsequent VM Exit (VMEXIT) event to access the one or more poisoned TLB entries and execute the malicious code to bypass a password authentication.

2. The method according to claim 1, wherein the hypervisor uses one or more nested page fault (NPF) events to learn the physical address of the target function.

3. The method according to claim 2, wherein the hypervisor, in response to learning the physical address of the target function, maps the virtual address of the victim process to the malicious code physical address.

4. The method according to claim 2, wherein the hypervisor manipulates one or more page table entries to trigger the one or more NPF events.

5. The method according to claim 1, wherein the hypervisor schedules the first vCPU at a same logical core as a second vCPU.

6. The method according to claim 1, wherein the hypervisor uses one or more CPU identification (CPUID) instructions to initiate transmission or receipt of covert data in a CPUID-based covert data channel.

7. The method according to claim 6, wherein the hypervisor causes the attacker process to execute the one or more CPUID instructions to trigger one or more VMEXIT events.

8. The method according to claim 1, wherein the attacker process is an unprivileged process and the victim process is a privileged child secure shell daemon process.

\* \* \* \* \*